(12) United States Patent
Eggers et al.

(10) Patent No.: US 8,874,324 B2
(45) Date of Patent: Oct. 28, 2014

(54) SENSOR DEVICE AND MODULAR UNIT THEREFOR

(75) Inventors: Thomas Eggers, Wermelskirchen (DE); Wolfgang Buss, Solingen (DE); Norbert Heller, Viersen (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 145 days.

(21) Appl. No.: 13/383,624

(22) PCT Filed: Jul. 16, 2010

(86) PCT No.: PCT/EP2010/060365
§ 371 (c)(1),
(2), (4) Date: Jan. 12, 2012

(87) PCT Pub. No.: WO2011/007008
PCT Pub. Date: Jan. 20, 2011

(65) Prior Publication Data
US 2012/0123649 A1     May 17, 2012

(30) Foreign Application Priority Data

Jul. 17, 2009 (DE) .......................... 10 2009 033 738
Jul. 23, 2009 (DE) ..................... 20 2010 005 427 U
Mar. 3, 2010 (DE) .......................... 10 2010 002 560
Mar. 8, 2010 (DE) .......................... 10 2010 002 671

(51) Int. Cl.
*E05F 15/20*          (2006.01)
*B60R 13/07*          (2006.01)

(52) U.S. Cl.
CPC ......... *E05F 15/2023* (2013.01); *E05F 15/2076* (2013.01); *E05Y 2400/852* (2013.01); *E05Y 2400/858* (2013.01); *E05Y 2900/546* (2013.01); *E05Y 2400/508* (2013.01); *E05Y 2400/502* (2013.01); *B60R 13/07* (2013.01); *E05F 15/2046* (2013.01)

USPC ..... 701/49; 701/36; 340/426.28; 340/426.36; 296/146.4

(58) Field of Classification Search
None
See application file for complete search history.

(56) References Cited

U.S. PATENT DOCUMENTS 5,929,769 A * 7/1999 Garnault ...................... 340/5.61
6,676,186 B2 * 1/2004 Greif .............................. 296/50

(Continued)

FOREIGN PATENT DOCUMENTS

CN          1953191 A     4/2007
DE          10205281 A1    8/2003

(Continued)

OTHER PUBLICATIONS

International Search Report PCT/EP2010/060365; Dated May 26, 2011.

(Continued)

*Primary Examiner* — Michael J Zanelli
(74) *Attorney, Agent, or Firm* — Cantor Colburn LLP

(57) ABSTRACT

The invention relates to a modular unit (10) comprising a sensor device (11) for actuating a movable part (1, 33), in particular a flap (1) of a motor vehicle. Said unit comprises a support element (12), on which the sensor device (11) comprising at least one sensor (21, 22, 23) is situated, in order to detect (3) an object (4) in a detection region (5, 6, 40) that borders the motor vehicle (2), the detection operation (3) initiating the actuation of the movable part (1, 33). According to the invention, the modular unit (10) is designed as an individual module (10) that is easily fitted in such a way that said unit (10) can be fixed to the motor vehicle (2).

41 Claims, 12 Drawing Sheets

(56) References Cited

U.S. PATENT DOCUMENTS

| | | |
|---|---|---|
| 2003/0216817 A1 | 11/2003 | Pudney |
| 2004/0183651 A1* | 9/2004 | Mafune et al. ............... 340/5.7 |
| 2007/0090311 A1* | 4/2007 | Pallaro ......................... 250/574 |
| 2007/0132552 A1* | 6/2007 | Kurpinski et al. ........... 340/5.72 |
| 2007/0205863 A1 | 9/2007 | Eberhard |
| 2011/0012624 A1* | 1/2011 | Gastel et al. ................. 324/686 |

FOREIGN PATENT DOCUMENTS

| | | |
|---|---|---|
| DE | 102004041709 B3 | 10/2005 |
| DE | 102005032402 B3 | 9/2006 |
| DE | 102006062772 A1 | 5/2008 |
| DE | 102007041288 A1 | 3/2009 |
| EP | 0770749 A2 | 5/1997 |
| EP | 1902912 A1 | 3/2008 |
| FR | 2899629 * | 10/2007 |
| WO | WO2009/000861 * | 12/2008 |

OTHER PUBLICATIONS

Chinese Office Action dated Jan. 23, 2014; re: Chinese Application No. 201080032442.4.

* cited by examiner

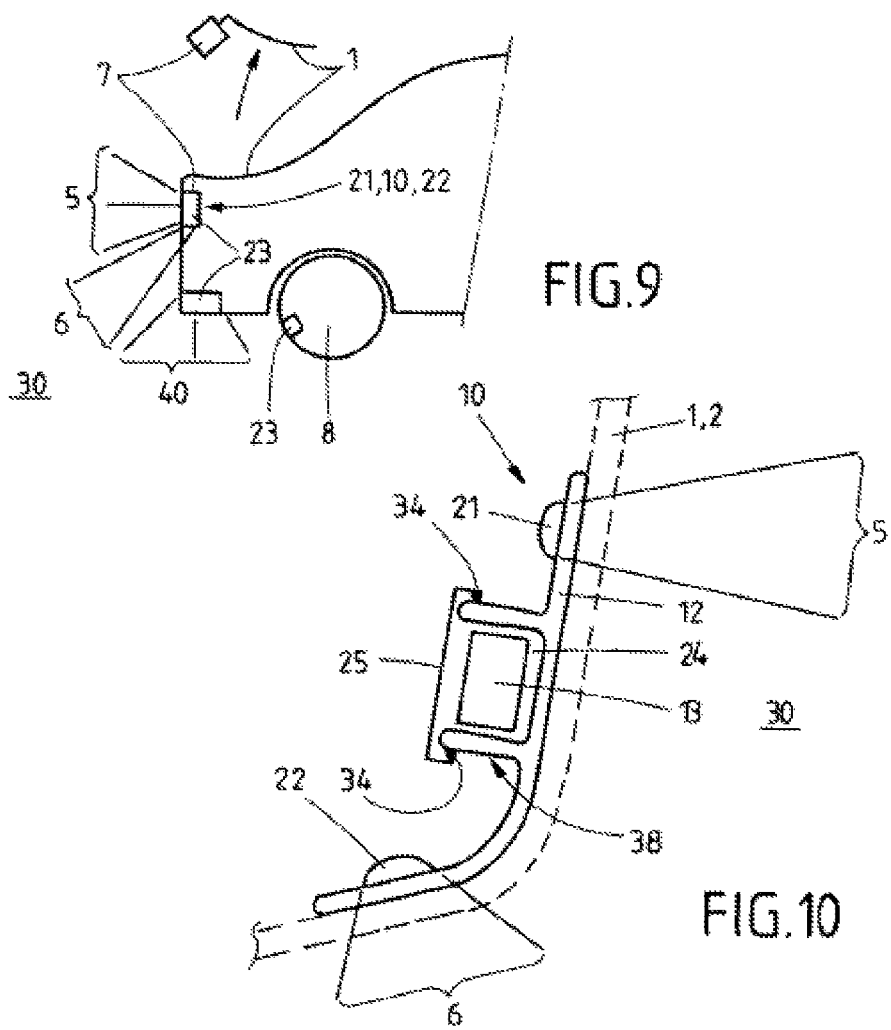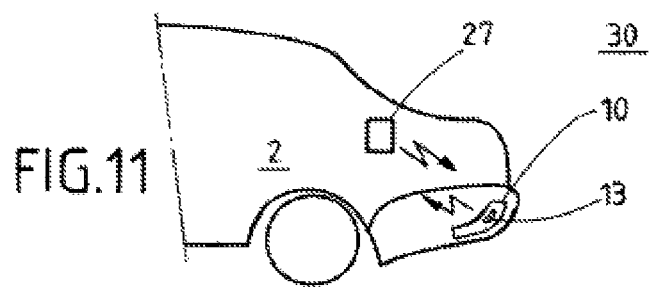

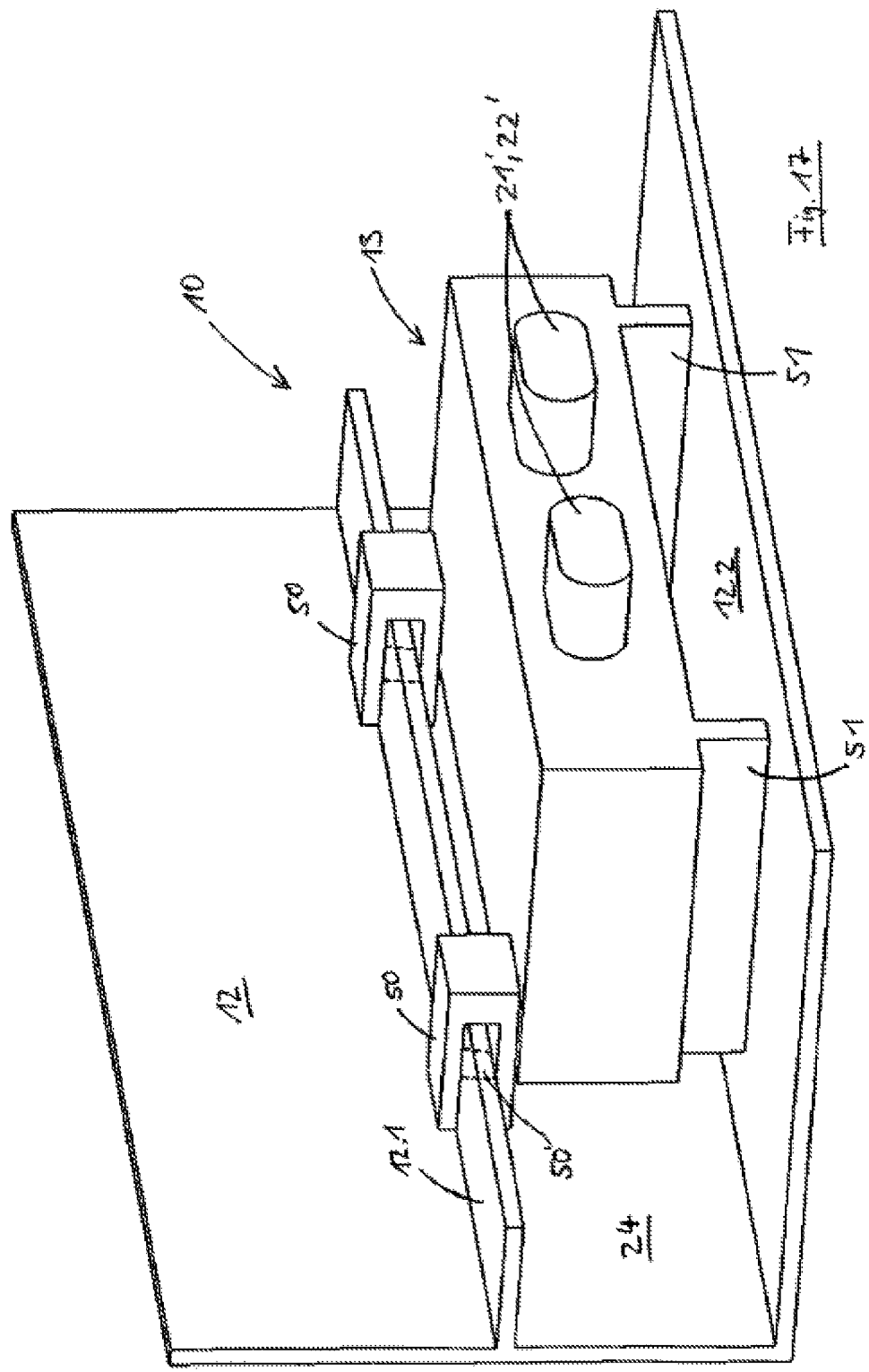

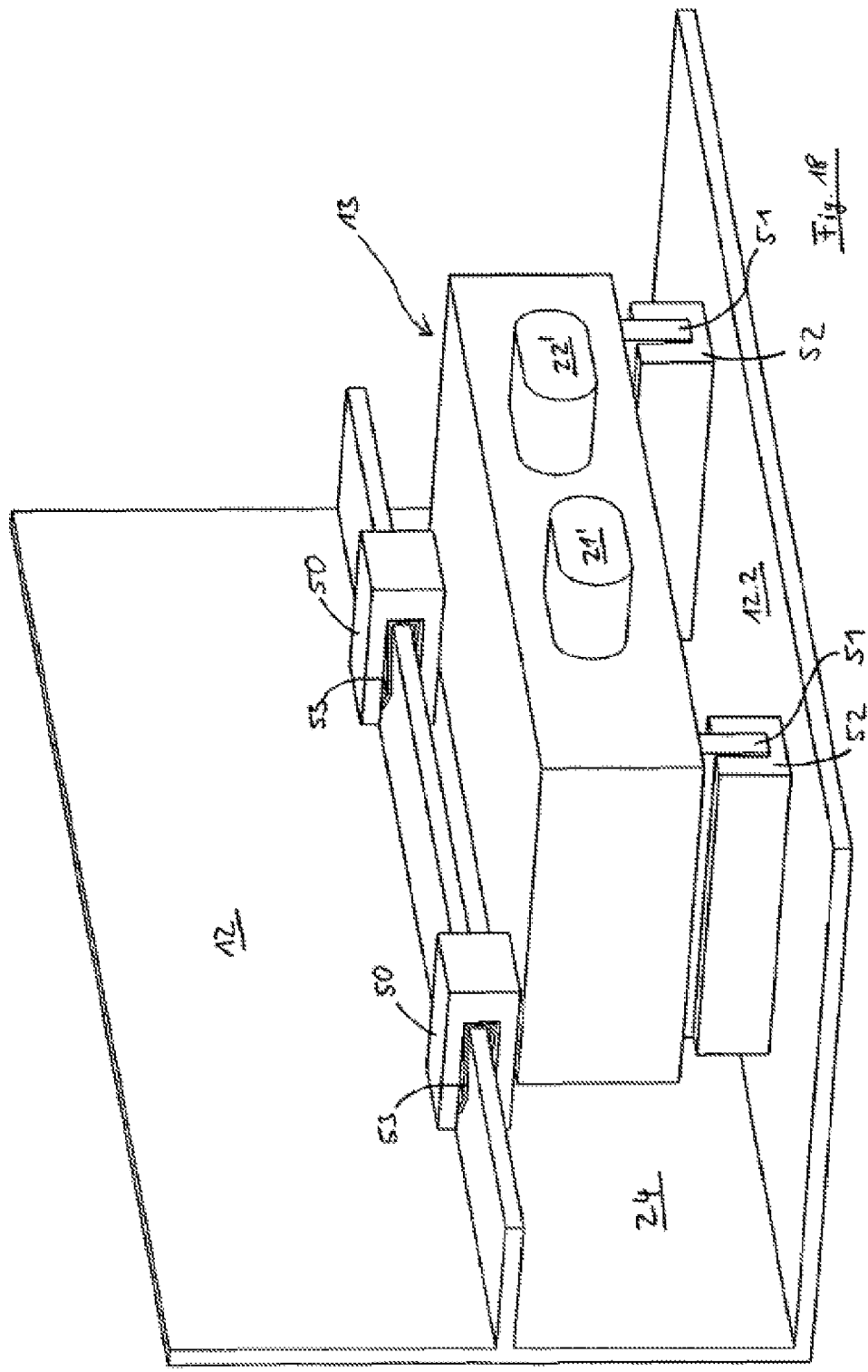

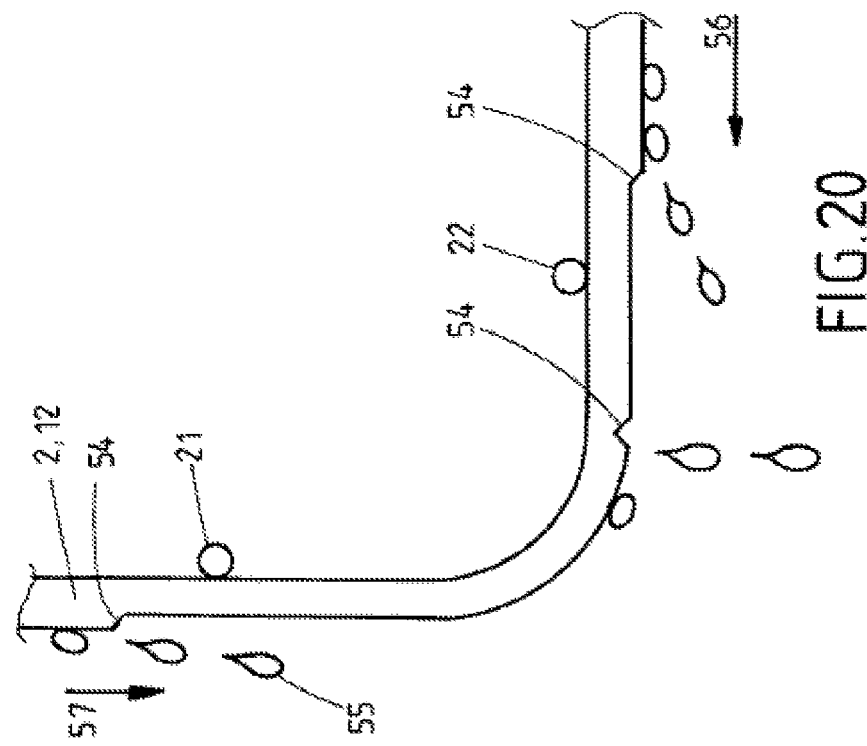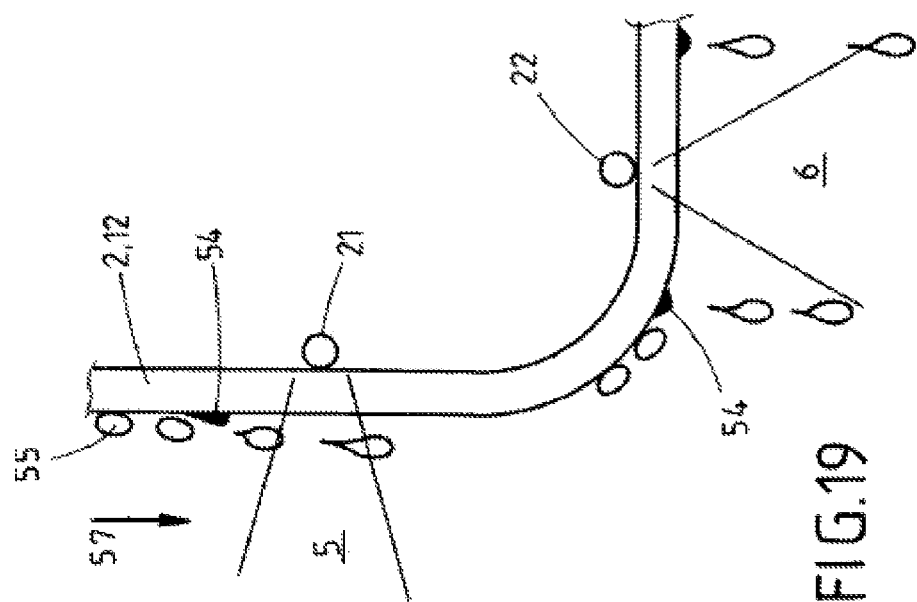

SENSOR DEVICE AND MODULAR UNIT THEREFOR

TECHNICAL FIELD

The invention relates to a module unit, among other things, said module unit having a sensor device for the purpose of actuating a moving part, particularly a hatch of a motor vehicle. The module unit also has a support element, wherein the sensor device is arranged on the same and has at least one sensor for the purpose of enabling the detection of an object in at least one detection area adjacent to the motor vehicle. In this way, it is possible to activate the actuation of the moving part via detection. This actuation preferably is performed without contact. However, the invention also only relates to such a sensor device, as well as to a method for actuation.

BRIEF DISCUSSION OF RELATED ART

Sensor devices for actuating moving parts of a motor vehicle without contact are known. These sense the presence and particularly the movement of a person for the purpose of recognizing the person's desire to open the moving part of the motor vehicle. The moving part of the motor vehicle can be a hatch, and particularly a rear hatch door, a side door, or a front hood.

The typical sensor device then enables said hatch to be opened or closed in an advantageous manner in cases where manual actuation thereof is not possible or is possible only with difficulty. To simplify the description below, the moving part will henceforth be termed the hatch.

The object detected by means of the sensor device can be a person who deliberately approaches the motor vehicle to open the hatch. In this case, actuation of the hatch means both an opening process, for example in cases where the person wants to place an object into the trunk using both hands, and also a closing process in cases where the person has removed an object from the trunk using both hands, and the hatch door is then closed.

The known sensor device has at least one sensor which is arranged on the motor vehicle via a support element. The sensors for the purpose of actuating the hatch door are usually attached inside the bumper, such that the support element is formed by the bumper itself. In this case, the technique is known wherein the sensors are glued or laminated on the surface of the bumper, and the sensors are designed as electrodes which function as capacitors and are wire- or film-shaped. In this case, the wires or films of the sensors formed by electrodes are attached on a part of, or preferably over the entire width of the bumper of the motor vehicle. As a result, the hatch door of the motor vehicle can be actuated from different regions adjacent to the hatch of the motor vehicle. As such, the sensors are a component of the rear bumper, and are attached thereto on the inside thereof by means of gluing or attachment means. Particularly, the technique is known wherein the sensors are inserted in the initial plastic injection molding process which produces the bumper, for the purpose of obtaining a one-piece component with coated sensors.

It has proven a disadvantageous feature of the prior art that the assembly of such sensor devices is complex and input-intensive.

BRIEF SUMMARY

The problem of the present invention is that of creating a module unit having a sensor device as described above, wherein the module unit can be attached to the motor vehicle in a simple manner with a simple assembly process.

An essential core aspect of the present invention is that of creating a single, easily manipulated module which can be attached to a motor vehicle, particularly to a hatch region thereof, in a simple manner. As such, the module unit is preferably outfitted with corresponding attachment elements, wherein the module unit can be reliably arranged on the motor vehicle using the same. In this case, the module unit can be attached by means of a part on the motor vehicle, with a positive fit, force fit and/or material connection. By way of example, a configuration can be contemplated wherein the module unit locks into, clips into, or is pushed into a part on the motor vehicle. Bonding by means of glue can also be contemplated. The module unit, particularly the support element, is made at least partially of plastic. The sensors can be capacitive, optical, or touch sensors, and particularly piezoelectric sensors.

It is essential in this configuration that an electronic device, particularly a control device, the same being connected to the sensor device, is arranged on the support element. This electronic device relays signals transmitted by the sensors to a primary electronic device which is arranged on the motor vehicle. In one possible embodiment of the invention, the electronic device transmits signals to the primary electronic device based on the motor vehicle in a wireless manner. In one embodiment of the invention which can be contemplated, the electronic device of the module unit can also function as the primary electronic device of the motor vehicle. In an additional possible embodiment, the sensor device can be integrated into the electronic device.

The sensor device has an advantageous configuration with at least one first and one second sensor, wherein the sensors have different detection areas, and particularly the different detection areas are of a different size.

The module device can be designed in such a manner that at least one sensor has an arrangement on the motor vehicle itself, on a lateral region thereof, rather than on the hatch unit of the motor vehicle.

Likewise, a configuration can be contemplated wherein the support element can be attached to the motor vehicle with a positive fit, force fit, or material connection, and particularly the support element can be attached to the motor vehicle or slid into a part of it via a locking connection. The corresponding part on the motor vehicle on which the support element is arranged can be designed having corresponding attachment elements, wherein the same work together with the attachment elements of the support element to create a reliable connection.

In one variant of the invention, the module unit is arranged on the emblem of the motor vehicle, or comprises the emblem of the motor vehicle itself, wherein the emblem is arranged visibly on the motor vehicle.

In general, the motor vehicle has a pivoting hatch door. A configuration can also be contemplated wherein a hatch camera device is provided on the motor vehicle, particularly on the hatch door, as a parking aid. In this case, a configuration can be contemplated wherein the module unit is integrated into the hatch door and/or at least particularly into the hatch camera device. The module unit can have a first and a second sensor which are arranged inside the hatch camera device. Likewise, it is possible for the camera of the hatch camera device to function as a sensor for the purpose of detecting an object located in the proximity of the motor vehicle. The camera of this hatch camera device can, of course, also simultaneously function as a parking aid in a separate functional mode.

The sensor preferably has a longitudinal extension, wherein the sensor is particularly designed preferably as a flexible device. One of the advantages of a flexible sensor device is that advantages result for the installation thereof.

The sensor device and/or the electronic device can be attached to the support element with a positive fit, force fit and/or material connection.

As an alternative, the sensor device and/or the electronic device can be integrated into the support element, particularly wherein the sensor device and/or the electronic device form a monolithic construction component together with the support element. In order to ensure a reliable detection of an object, the sensor device has an extension which is oriented in the width dimension of the motor vehicle, and the sensors particularly run substantially parallel to each other.

One manner of further developing the invention can involves connecting the electronic device to at least one additional third sensor, the same being arranged on the motor vehicle, wherein this connection enables the transmission of data. In this case, the third sensor can be arranged in a tire, on the hatch camera device, on a license plate illumination unit, on a garnish molding, on a bumper, on a lock cylinder in a locking unit, in a locking unit which locks the steering column, in a windshield washer assembly, in a hatch light unit, or in a handle of the motor vehicle. The third sensor can be, by way of example, a heat sensor, a proximity sensor, a speech sensor or a visual sensor, particularly for the purpose of recognizing a field of vision.

In order to further increase the ease of installation, positioning means can be included which ensure one discrete possibility for the attachment of the support element on the motor vehicle. The positioning means can be, for example, recesses or notches molded into the support element which can only be arranged on the motor vehicle component in one position. As such, it is possible to ensure that the sensors arranged on the support element are placed in the desired position to enable reliable detection of an object in the area of the motor vehicle.

The electronic device preferably has a circuit board, wherein the sensors can be arranged on the same and wherein the circuit board and the sensor are preferably integrated inside a casting compound. As an alternative, the module unit can also have a plastic housing, wherein the sensor device including the electronic device is located inside the same. The housing can be fixed on the motor vehicle via corresponding attachment means.

In one possible embodiment of the module unit, at least one sensor can be integrated as a partial sensor inside the support element, and at least one contact terminal of the partial sensor projects out of the support element. This means that a first partial sensor is located inside the support element, and a second partial sensor is attached on the support element.

Both partial sensors are accordingly connected via contact terminals, such that both partial sensors form a complete sensor.

The support element preferably has a recess in which the electronic device is located, and particularly a cover element which closes the recess and seals the same. The cover element can, by way of example, be designed with a corresponding seal, such that no dirt, moisture, etc. penetrates into the recess and can therefore damage the functionality of the electronic device.

The support element has at least one reinforcing element which is particularly also the sensor. The reinforcing element can be, for example, a metal strip or metal plates which reinforce the construction of the support element. In the special embodiment of the invention, this reinforcing element can serve as an electrode which consequently takes on the function of the sensor to become a component of the sensor device according to the invention.

A testing module is advantageously included in the configuration, and tests the functionality of the sensor device. The testing module can be located near each of the sensors, for example, wherein the testing module is preferably attached to the support element. Of course, an alternative embodiment can likewise be contemplated wherein such a testing module is arranged on the motor vehicle itself, and therefore carries out the testing of the sensor device functionality from a greater distance away.

In an additional embodiment of the module unit, an emergency switch can be included which is accessible from the outside and which can be activated by a user's touch. In case the functionality of the module unit or the sensor device is disrupted, a signal can also be propagated by means of touching the emergency switch, actuating the moving part.

According to the invention, actuation of the moving part following a positive detection by means of the sensor device means that the moving part can move out of the closed position thereof and into the open position thereof, or just the opposite.

However, in this case it should be noted that actuation of the moving part, meaning movement of the moving part into its open position and/or closed position, only occurs if a positive authentication by means of the object has also taken place. This authentication typically takes place via an ID transmitter which the person carries. The ID transmitter in this case has a corresponding identification code which is tested by the device mounted on the vehicle for the purpose of authentication. Only if a positive authentication occurs will the corresponding actuation of the moving part be carried out.

In one possible embodiment of the invention, the energy supply for the electronic device can be an inductive system. For example, the electronic device can have a coil element which works together with a counter coil element, and these can provide a corresponding supply of energy to the electronic device.

In one possible variant of the invention, an illuminating device can be included which is particularly activated during the detection process. In this case, a configuration can be contemplated wherein the illuminating device provides feedback to the user via a defined manner of lighting. For example, turn signal lights or hatch lights can serve as the illuminating device, the same illuminating or blinking during or after successful detection and/or authentication. Likewise, in addition or as an alternative, an acoustic signal can provide the user with corresponding feedback during or after successful detection and/or authentication.

In one measure which improves the invention, a threshold value control can be included which recognizes the actual user's touch on the moving part. In the event that the user leans up directly against the moving part and/or touches the same, without actually intending to actuate the moving part, the threshold value control recognizes this situation, such that the moving part opening process is not activated.

Likewise, a configuration can be contemplated wherein at least one sensor is arranged between the support element and the component on the motor vehicle, wherein particularly the support element is designed to have a profile which is oriented toward the component on the motor vehicle, and which offers a particular installation site for the sensor, wherein the same is particularly sealed with respect to the outside.

Furthermore, a configuration can be contemplated wherein the electronic device can be attached via holding elements to the vehicle or on the support element of the module unit with a positive fit, and/or force fit connection by means of opposing holding elements. These holding elements can be designed as locking elements or as clipping elements or the like, to thereby securely attach the electronic device, and particularly the control device, to the vehicle and/or to the support element of the module unit. In this case, a configuration can be contemplated, by way of example, wherein the holding elements are integrated into the housing of the electronic device for the purpose of being able to work together mechanically with the vehicle, for example. A configuration can also be contemplated wherein the holding elements are integrated on the vehicle, particularly on the bumper, on the door sill, or the like, and/or on the support element of the module unit. These holding elements work together with opposing holding elements on the other element. In this case, the electronic device can be directly or indirectly attached to the vehicle via the holding elements, for example in a hanging or standing manner. A configuration can also be contemplated wherein, in addition to the included holding elements, buffer elements are included, wherein the electronic device is supported by means of the same on the element which is situated on the vehicle, or on the support element of the module unit, and wherein said buffer elements receive a substantial part of the force generated by the weight of the electronic device. By means of these buffer elements, tolerances and oscillations which are necessarily created in a vehicle can be damped and/or lessened by spring action for the purpose of protecting the electronic device from mechanical influences as much as possible. Likewise, one configuration can integrate the holding elements with the buffer elements in order to consequently attach the electronic device to the vehicle and/or to the support element of the module unit. Furthermore, a configuration can be contemplated wherein only the buffer elements are used to attach the electronic device, wherein in this case the buffer elements work together advantageously in a force-fitting manner with the corresponding counter elements on the vehicle or on the support element. Both the holding elements and the buffer elements can be directly sprayed, welded, glued, screwed or otherwise attached onto the housing in order to give the electronic device a secure seat on the vehicle. Corresponding counter elements which can, by way of example, comprise a drilled hole, or likewise can comprise locking elements, can also be attached just like the holding elements to, for example, bumpers, door sills and/or support elements of the module unit, or the like. The holding elements can have additional metal clips, screw elements, or the like which serve to attach the electronic device.

A problem addressed by the present invention is that of providing a sensor device for the actuation of a moving part, particularly a hatch of a motor vehicle, wherein the same enables safe manual operation and/or actuation of the moving part, and can be produced in a cost-effective manner.

The invention also comprises a sensor device for the actuation of a moving part, particularly of a hatch of a motor vehicle, having at least one sensor for the purpose of detecting an object in at least one detection area adjacent to the motor vehicle, such that it is possible to actuate the moving part via said detection, wherein the sensor is designed as a capacitor. In this case, all technical features of the sensor device can also be included as indicated above for the case of the sensor device in the module unit according to the invention, or as will be disclosed for the case of the sensor device in the method according to the invention. As such, it is not absolutely necessary for the sensor device according to the invention to be likewise constructed into a module unit via a support element.

As already indicated, at least one sensor can be designed as a wire or as a conducting film, wherein the same particularly has a longitudinal extension. Likewise, a configuration can be contemplated wherein at least one sensor is designed with a film-like or flat shape, and particularly the longitudinal extension thereof is designed to be significantly larger than the width of the corresponding sensor. As already indicated above, the sensor can be arranged on the motor vehicle in the bumper area or in the door sill area, and/or the lower door area of the side doors. For this purpose, the support element from the module unit according to the invention can be used. A configuration can also be contemplated wherein this sensor extends over the complete width of the bumper and/or of the door sill, or only over a sub-region thereof. Also, a configuration can be contemplated wherein multiple sensor devices and/or multiple module devices are employed in a motor vehicle for the purpose of, by way of example, actuating the side doors, the trunk lid, and/or the hood as moving parts. In this case, at least one sensor can also be arranged directly on the moving part. This arrangement is particularly interesting in the case of the side door, because in this case there is little room to arrange the sensor device on the fixed chassis of the motor vehicle.

The attachment of a sensor in or on the moving part also involves the possibility that the moving part can follow the object in the detection area by means of the sensor device controlling a drive device for the moving part. As such, it is possible that, for example, the side door is independently opened by a hand or a foot (the object) of the operator, for example, simply when he or she tries to remove his or her hand from the detection area of the sensor, and the sensor detects this movement and signals the drive device to actuate the moving part to follow the object in order to keep it in the sensor detection area.

In order to simplify the manipulation of the sensor device to the greatest extent possible, for the purpose of actuating the moving part the detection area of the sensor should not project into the pivot area of the moving part. This is because a collision with the object being detected can occur, unless the corresponding sensor serves the purpose of allowing the moving part to follow the object as described above.

In addition, it is also possible for the sensor device having at least one sensor to initially execute a reference measurement for the purpose of first detecting disruptive influences, such as foul weather, obstacles or the like. This reference measurement can be saved in the electronic device, particularly in the control device, as a reference value. Once the reference measurement has been carried out, the sensor can make a metrological detection of an object in the detection area. In this way, it is possible to reliably prevent malfunctions in the actuation of the moving part. As such, it can be contemplated that the sensor device executes the reference measurement described above during or shortly after the parking of the vehicle, to detect objects in the detection area, for example, which could later lead to measurement errors when the moving part is intentionally actuated. In addition, this reference measurement can be used for the purpose of determining threshold values as part of the subsequent measurement. At this point it should also be noted that it is optionally possible to switch the sensor device on or off via an additional switch in the vehicle. In addition, the activation of the sensor device by the electronics in the vehicle can be controlled, for example via the steering wheel lock, the starter switch, a switch on the shifter, or the like.

It is also possible for the at least one sensor or all sensors of the sensor device to be monitored for malfunctioning plug connections, solder connections, or breaks in wiring. For this purpose, a sensor can be equipped with a terminal resistor, for example, the same being arranged on the end of the sensor electrode. As such, it is possible to determine whether the resistor can be reached metrologically or not, by means of a comparison measurement. If in this case the terminal resistor can no longer be detected, it can be assumed that a defect and/or break in the sensor exists at some point. This can be detected by the control device as an error, for example, and then relayed to the vehicle's electronics system.

A configuration can also be contemplated wherein at least one sensor is designed as a continuous conductor, and therefore has no terminal end. In this case, then, the total resistance of the sensor can be detected metrologically as a single discrete value. In the event that this total resistance of the sensor exceeds a prespecified resistance value, a clear electrical defect in the sensor is indicated. Nevertheless, in order to avoid the need to connect the corresponding sensor at two different points in a conducting manner, the sensor element can be designed as a loop or with a U shape, such that the input connection and the output connection of the sensor element are arranged near to each other.

A configuration can also be contemplated wherein at least one sensor is equipped with a shielding element. This shielding element can be partially coiled around the sensor as a shielding film for the purpose of more precisely defining the detection area of the sensor. The geometry of the detection area of the sensor is therefore prespecified by the unshielded region of the sensor which is not sheathed and/or covered by the shielding film. As such, a sensor constructed, by way of example, over the complete width of a motor vehicle, can be oriented by means of the shielding element to only the corner area of the motor vehicle (the transition area from the hatch to the side area). In addition, a configuration can be contemplated wherein a so-called active shield is used for one or each of the sensors, for the purpose of orienting the detection area forward and away from the active shield. As such, each sensor is arranged between its detection area and its active shield. Each sensor can be fully or partially sheathed in plastic or rubber, along with its shielding element and/or the active shield.

This sheathing of the sensor can be accomplished by means of, for example, an injection molding or extrusion process. As such, the corresponding sensor forms a monolithic component along with its shielding element and/or its active shield. Likewise, the sensor can also be arranged as a part which is separate from its shielding element and/or its active shield.

The sensor can likewise be attached directly or indirectly to the vehicle or to the support part of the module unit by means of a mat or a mesh, wherein the sensor is fully or partially embedded in said mat or mesh. The mat or the mesh can then in turn be attached indirectly via additional holding elements, particularly via locking elements or clips, as described above. An additional connection can be made in the region of the clip for the purpose of improved sensing.

Likewise, a configuration can be contemplated wherein the sensor device according to the invention includes a first sensor on the motor vehicle having a first horizontal detection area, and at least a second sensor having a second vertical detection area, such that not only the movement of an object into the detection area of a sensor is detected, but also the corresponding movement of the object is detected. By using at least two sensors in the sensor device according to the invention, two different directional movements of the object occurring in sequence in the different detection areas can be determined as well.

In order to improve the measurement precision or the measurement options of the sensor device further, at least one capacitive coupling of a sensor can be modified in a configuration. In addition, a configuration can be contemplated wherein the capacitive coupling of the additional sensors can be designed as modifiable, or can be modified following the modification of a first sensor. In this case, the capacitive modification can be controlled via a threshold value, such that a situation is possible wherein the first sensor, for example, is activated, but the second sensor recognizes that the object has already entered its detection area, but is not yet fully present in the detection area. As such, it is also possible to control the actuation of the moving part in a targeted manner via a merely partial appearance of the object in the detection area of a sensor.

At this point it should be noted that a conditional access system and/or a security system, for example, is/are only activated once at least one of the sensors of the sensor device perceives an object in its detections area. Likewise, the activation of the conditional access system or the security system only occurs once it has been determined that this object in fact intends to access the vehicle. This can take place, for example, by means of the successful detection of a series of movements of the object, or by means of two or more sensors detecting the object in the detection area. As such, it can be contemplated that the activation of the conditional access system and/or the security system only occurs once the measurement value of a sensor falls below and/or will fall below a prespecified threshold value.

Typically, access is only granted to the vehicle once the conditional access system and/or the security system has successfully carried out an authentication exchange with a mobile ID transmitter. However, precisely this exchange can be made dependent on the measurement results of the sensor device according to the invention as described above.

In addition, a configuration can be contemplated wherein at least one sensor of the sensor device according to the invention serves as an antenna or as an additional antenna for the conditional access system and/or the security system. The authentication query carried out by the conditional access system, for example via the mobile ID transmitter or a keyless go card, can serve to—but need not necessarily—activate the sensor device according to the invention. More importantly, the sensor device can also serve to awaken the conditional access system and/or the security system from standby. The additional query of the ID transmitter merely constitutes an additional improvement in security to prevent unauthorized opening of the moving part on the motor vehicle.

For the purpose of thoroughness, it should be noted that the detection of an object can take place both when the motor vehicle is locked and also when the motor vehicle is open.

Likewise, the camera device, particularly the hatch camera device, can be controlled and/or activated via the sensor device for the purpose of preventing mechanical collisions between the vehicle, or only the moving part thereof, and an element of the surroundings during the opening process, for example.

In addition, a configuration can be contemplated wherein other technical means are added to the camera named above for the purpose of preventing a collision between the moving part and an obstacle or object upon opening or closing of the moving part. In this case, the additional means can be, by way of example, an additional proximity sensor, a radar system, an ultrasound sensor or the like. As such, the configuration ensures that the opening or closing action of the moving part—for example following an optional authentication—takes place once it has been determined that no object or obstacle is present in the region of movement of the moving part. This can be particularly important in the case of low-clearance garages. In addition, the sensor device according to the invention can serve to detect dips or bumps in the ground surface in the detection area of the sensor device's sensors, in order to prevent vehicle collisions. The measurement results of the sensors can, by way of example, be emitted inside the motor vehicle for the passengers as a warning signal.

In addition, a configuration can be contemplated wherein at least one sensor of the sensor device is used for the purpose of determining whether an object, particularly a person, is present in the region of movement of the moving part. Only once it has been determined that no object is present, can the electronic device, particularly the control device, be permitted to activate the moving part by means of actuation. This configuration effectively reduces the danger of jamming or pinching. Of course, the additional sensor systems inside the vehicle, for example the parking system, the proximity warning system, or the like, can also be used for the purpose of determining that a person is in danger outside the region of danger of the moving part.

In addition, a configuration can be contemplated wherein a sensor of the sensor device is arranged on the vehicle by means of holding elements, particularly on the inner side of the bumper or of the moving part, and/or in the door sill area. The holding elements themselves can be designed as clips or locking elements. The clips themselves can likewise be designed to be able to adhere, in order to hold the sensor via a material connection, for example. The configuration can also include positive-fitting loops or holding means on the clips for attaching the sensor.

Basically, at least one sensor can be connected via the support element to the module unit according to the invention. Likewise, a configuration can be contemplated wherein for each sensor a separate support element is available to form the module unit. Of course, multiple sensors can also be arranged on one support element next to each other, parallel to each other, or behind each other. It can also be contemplated that at least one sensor element is arranged outside the module unit, wherein another sensor is included on the support element of the module unit.

In principle, at least one sensor is arranged to form its detection area in a sinuous or looped and/or bow-shaped form. This embodiment of the sensor is of particular importance if the sensor is not only intended to detect whether an object lies completely within the detection area or not, but rather if the sensor is also intended to detect whether the object has penetrated the detection area entirely or only partially. As such, this embodiment of the sensor is particularly suitable if the measurement works with threshold values. Of course, multiple sensors of the sensor device according to the invention can also be designed in this manner.

In addition, a configuration can also be contemplated wherein the sensor device according to the invention also supports and/or entirely replaces, for short distances less than 2 meters, a parking system or a guidance system. The measured signals from the sensor device according to the invention can therefore also be used to enhance driving safety for the motor vehicle, particularly when parking or at low speeds.

In addition, a configuration can be contemplated wherein a sensor is additionally equipped with a heating element, and/or a corresponding heating element is arranged near a sensor, in order to evaporate water in the region of the sensor as quickly as possible by means of additional heat. Also, this heating element can serve to melt frozen water which has frozen solid on the sensor or immediately nearby. This configuration makes it possible to significantly increase the accuracy of measurement performed by the sensor, because water leads to serious metrological disruptions in a capacitive sensor. In this case, it can also be contemplated that the heating element is temporarily switched on and off according to the weather by means of the electronic device, for the purpose of regularly ensuring that the immediate surroundings of each sensor are free of water.

It should also be noted that it can be contemplated to use the sensor itself or, by way of example, a shielding element for the sensor, as the heating element. The control device can achieve this by switching on the sensor or the shielding element accordingly as a heating element, and separately using the same as a sensor or shielding element. Of course, an additional heating element can be present to generate the required heat as well. Only for reasons of thoroughness, it should be noted that the heating element can be gathered with the sensor and optionally with the shielding element to form one component, by means of sheathing or insulating the same, for example.

Additional water shunting elements are either arranged directly on the sensor, on the support element for the module unit, on the bumper, the door sill or the like. These are intended to conduct water out of the detection area of the corresponding sensor as well as possible. This configuration intends, to the greatest extent possible, to minimize the disruptions and/or negative influences described above on measurements affecting each sensor as a result of the water present. The water shunting elements themselves can be designed as projections or cut edges, or as drain channels and/or holes. The configuration in this case is intended to prevent a film of water from forming, particularly in the immediate detection area of the sensor. The water shunting element can be designed with a wedge shape, for example, whereby a cut edge is formed to create a water course, and the drops thereof separate from the water shunting element at that point. The water shunting element can also comprise a cut edge which is worked into the support element or the bumper, or the like. In addition, water grooves or perforations can be contemplated to shunt and/or drain the water from the sensor, and can be arranged on the support element or the vehicle, particularly on the bumper, the door sill or the like.

For example, it can be contemplated that a first and second sensor are included, wherein the object, particularly the authorized user, performs a conscious action which is detected by the first or the second sensor. The conscious action can be approaching with the arm or hand in the proximity of the first or the second sensor, for example. Of course, it is also possible that the module unit uses only one sensor for the corresponding detection of an object, whereby it is possible to actuate the moving part via this detection.

By way of example, one possible embodiment can be contemplated wherein the first and then the second sensor are activated for the purpose of detection, or wherein both sensors are activated at the same time for the purpose of detection.

In an additional alternative, a conscious leg or foot movement of the user is detected by the first sensor, and an additional body movement of the user is detected by the second sensor.

In addition, at least one illuminating device of the motor vehicle can have a defined manner of illumination during the detection.

In one possible embodiment of the invention, the module unit is arranged in the hatch area and/or in the area of the side door of the motor vehicle, particularly below a sliding side door. An opening operation of the sliding door can be initiated via a corresponding detection of a person who is located near the sliding side door of the motor vehicle. This embodiment is particularly useful in vehicles that are used as commercial vehicles, in particular as vans or trucks.

The electronic device is advantageously connected to at least one third sensor and/or switch which is arranged inside the motor vehicle. Particularly, the third sensor and/or switch is arranged in the motor vehicle in such a manner that it can be actuated by means of the foot and/or knee and/or elbow and/or shoulder and/or head of the user. A configuration can also be contemplated wherein an opening movement and/or closing movement of the sliding side door can be initiated by means of actuation of the third sensor and/or switch.

In the event that the user is located inside the motor vehicle, it can be contemplated that a closing of the sliding door is possible by means of actuation of the third sensor and/or switch. Likewise, the opening of the sliding side door can also be initiated by means of actuation of the third sensor and/or switch. The third sensor and/or switch can be designed as a proximity sensor, a touch-less sensor, or as a pressure switch.

The third sensor and/or switch is advantageously arranged in or on the sliding side door for the purpose of initiating an opening movement and/or closing movement of the sliding side door of the motor vehicle. Likewise, an arrangement thereof in or on the door panel, on the vehicle seat, or in the floor area, or on various decorative elements inside the motor vehicle can be contemplated.

In one possible embodiment, a closing movement of the sliding side door can be initiated by the user activating the third sensor and/or switch, the latter being located inside the vehicle, for example. It can likewise be contemplated that the user must initially actuate the third sensor and/or switch inside the vehicle upon leaving the motor vehicle. An additional detection by the sensor of the module unit is necessary to initiate an actual closing operation of the sliding side door. In addition, it is also possible to realize the activation of the third sensor inside the vehicle via a defined pattern of movement.

The third sensor can be deactivated depending on the operational state of the motor vehicle. This means that when the motor is "running" and/or activated, the third sensor and/or switch for opening the sliding side door is deactivated. However, in the configuration, such a deactivation can in turn be deactivated by the user, such that even if the motor is "running," the user can initiate a closing and/or opening movement of the sliding side door via the third sensor and/or switch.

Likewise, in an additional configuration, an additional motor vehicle door and/or hatch and/or tank door can be unlocked and/or locked via an actuation of the third sensor.

In addition, it is possible that the speed of the opening movement and/or closing movement of the sliding door can be changed, and particularly the electronic device controls and/or regulates the speed of the opening movement and/or closing movement of the sliding door.

The method according to the invention can be designed such that the actual activation of the moving part takes place after a defined time and/or according to a defined distance that the user must have from the module unit. In this case, the configuration can include the specification of a defined time which initiates the opening of the moving part with a delay following a positive detection and/or following a positive authentication procedure. Likewise, due to the construction of the motor vehicle, particularly of the moving part, it can be advantageous for the opening of the moving part to proceed only if the user is located at a defined distance from the moving part. This means that the necessary distance from the user is determined via the sensor device according to the invention which is located inside the module unit. In one possible embodiment, it can be necessary for the user to first move away from the moving part for an actuation of the moving part to take place.

In addition, the invention can include a configuration wherein the module unit is constructed with a built-in illuminating device, the latter accordingly communicating to the user the necessary distance based on its manner of lighting. In the event that the user is located too close to the motor vehicle, the illuminating device can, for example, signal the user by means of a first color. If the user is sufficiently distanced from the module unit, the illuminating unit changes its color and the opening movement of the moving part can be carried out.

The invention can also include a configuration wherein the authentication process is started and the sensor device is activated via an ID transmitter which the user carries with him or her, even though the user may be located outside the detection area. In this case, the method according to the invention offers the possibility of the user activating the ID transmitter from a greater distance, such that the authentication process can be activated first.

Only when the user is close to the motor vehicle, particularly to the module unit, does a corresponding detection take place via the sensor device for the purpose of initiating the actuation of the moving part. This means that the authentication process can be advanced to before the detection process for actuating the moving part. The sensor device can be activated as soon as a positive authentication takes place.

A configuration can also be contemplated wherein actuation of the moving part takes place according to a signal of speed. This means that an actuation of the moving part is only possible if the motor vehicle is stationary and not in motion. In an additional possible alternative, a third sensor is provided, wherein the hatch opens via a positive detection via the first and the second sensors, a windowpane arranged on the hatch opens via a positive detection via the first and the third sensors, and the hatch closes via a positive detection via the second and the third sensors.

Features and details which are described in the context of the method according to the invention also of course apply in the context of the device according to the invention, and vice-versa. The method according to the invention can be carried out by means of the module unit and/or the sensor device according to the invention.

BRIEF DESCRIPTION OF THE DRAWINGS

Additional advantages, features and details of the invention will become clear from the following description, wherein multiple embodiments will be described and explained with additional specificity and detail through the use of the drawings. The disclosed features of the invention in the description, in the illustrations, and in the claims can be essential for the implementation of the invention either individually or in any possible combination thereof.

FIG. 9 shows an additional embodiment alternative of the module unit, wherein the same is integrated into a hatch camera device, FIG. 10 shows a possible attachment alternative of the electronic device on the support element of the module unit, FIG. 11 shows a schematic illustration of a possible arrangement of the module unit, the same being connected to a primary electronic device and able to communicate data to the same, FIG. 17 shows a possible attachment of the electronic device on the vehicle or the support element, FIG. 18 shows an additional attachment option for the electronic device similar to FIG. 17, FIG. 19 shows a possible embodiment of water shunting elements in the region of the sensors, FIG. 20 shows an additional embodiment of the water shunting element in the region of the sensors.

DETAILED DESCRIPTION

Figure 1:
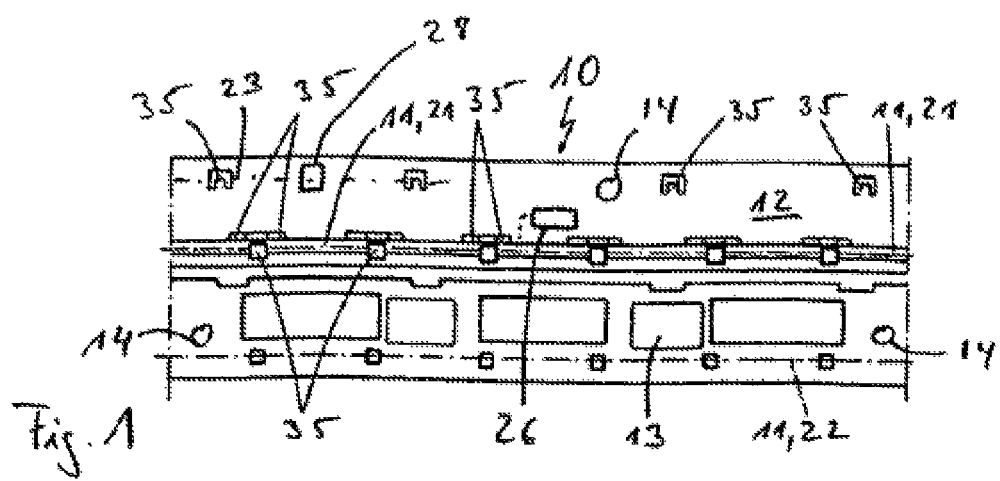
FIG. 1 shows a module unit according to the invention, having a sensor device, support element, and electronic device.

FIG. 1 shows a purely schematic view of a possible embodiment of the module unit 10 according to the invention, wherein the same is constructed having a sensor device 11 for actuating a moving part, particularly a hatch of a motor vehicle. The following describes this embodiment in great detail. The module unit 10 has a support element 12, and the sensor device 11, with at least one sensor 21, is arranged on said support element 12. The sensor 21 is attached to the support element 12 in this case via attachment means 35. The sensor 21 in this case has a longitudinal design which extends transversally to the direction of the vehicle. An additional sensor 22 can be attached to the support element 12 parallel to the schematically illustrated sensor 21 and at a distance therefrom. This additional sensor 22 is not explicitly illustrated. In addition, a third sensor 23 can be attached above the sensor 11 in the region of the attachment means 35 located in an upper edge region of the module unit 10.

The module unit 10 also has an electronic device 13 which is connected to both the sensor device 11 and to a primary electronic device 27 on the motor vehicle. The latter is illustrated in an exemplary manner in FIG. 11.

Moreover, a testing module 26 is arranged on the module unit 10, and the former tests the functionality of the sensor device 11, particularly of the individual sensors 11. The support element 12 is produced from a plastic material. In this case, the support element 12 as well as the module unit 10 is designed as separately manipulable modules in such a manner that the module unit 10 can be attached to the motor vehicle in a simple manner. This means that the module unit 10 with all the components illustrated in FIG. 1 can be attached by the worker during the installation of the same on a motor vehicle part.

In the present embodiment, attachment elements 14 for attaching the module unit 10 to the motor vehicle 2 are illustrated in a purely schematic way. These enable the module unit 10 to be fixed to the motor vehicle. In addition, an emergency switch 28 is included which can be activated by touch by the user. In the event that the sensor device 11 malfunctions, the user can actuate this emergency switch 28 to initiate a corresponding activation of the moving part 1.

Figure 2:
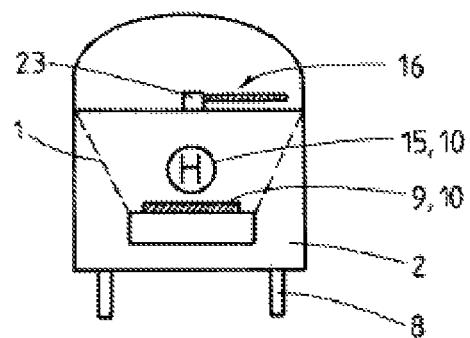
FIG. 2 shows an alternative arrangement of the module unit on the motor vehicle.
Figure 3:
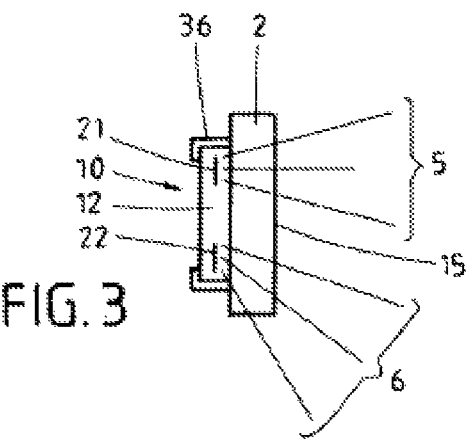
FIG. 3 shows a possible attachment alternative for the module unit according to FIG. 2.

A motor vehicle 2 is illustrated in FIG. 2. The motor vehicle 2 has an emblem 15 which can display the vehicle logo, for example. In the present embodiment, the emblem 15 is integrated into the module unit 10 according to the invention. In FIG. 2, as also in the remaining embodiments up to FIG. 15, the sensor device 11 has at least two sensors 21, 22. FIG. 3 shows a possible cutaway view of the emblem 15 according to FIG. 2. As can be seen in FIG. 3, the motor vehicle 2 has two fixing elements 36 on the inside, and the module unit 10 is attached inside these fixing elements 36. A first sensor 21 and a second sensor 22 are attached in the support element 12. The emblem 15 is attached in a visible manner on the outside. Likewise, a configuration can be contemplated wherein the support element 12 is designed as an independent component which can be visible for the user from the outside, and the support element 12 only supports the emblem 15 on the outer surface of the support element 12. The emblem is portrayed schematically in FIG. 2. The first sensor 21 has a first detection area 5, and the second sensor 22 has a second detection area 6. In FIG. 3 as also in the remaining embodiments up to FIG. 14, the detection areas 5, 6 can be designed to have different sizes.

Figure 7:
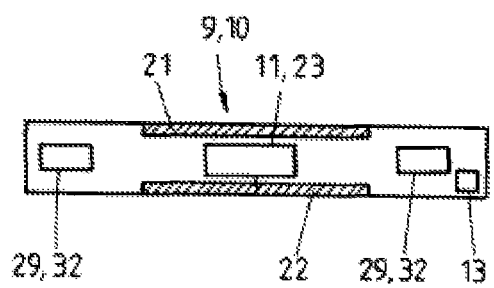
FIG. 7 shows an additional embodiment alternative of the module unit which is designed as a license plate illuminating device.

A configuration can also be contemplated wherein the module unit 10 can be designed as a license plate illumination device 9. This is shown in FIG. 2 and FIG. 7. In this case, the module unit 10 has two illuminating devices 29, 32 which serve to illuminate the license plate of the motor vehicle. In addition, the module unit 10 is designed having the electronic device 13. The sensor device 11 with a third sensor 23 is designed in the center. The sensor 23 can function as a parking aid. The first sensor 21 and the second sensor 22 are likewise arranged on the module unit 10, and the third sensor 23 is arranged in the center between the first sensor 21 and the second sensor 22. Of course, additional options for positioning the first sensor 21 and the second sensor 22 can be contemplated.

An additional embodiment is portrayed in FIG. 2, wherein the module unit 10 can communicate with the third sensor 23, the latter being integrated on the vehicle itself, particularly on a windshield wiper assembly 16.

Figure 4:
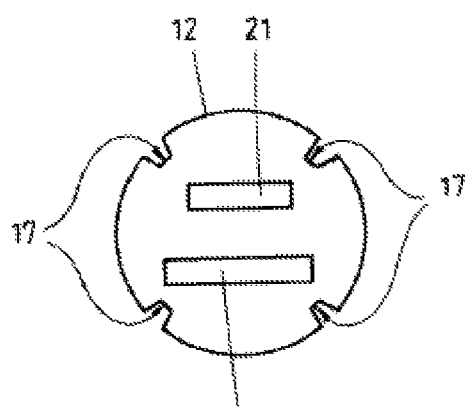
FIG. 4 shows a possible embodiment of the module unit for reliably fixing the same on the motor vehicle.

FIG. 4 shows the support element 12, on which the first sensor 21 and the second sensor 22 are arranged. In addition, the support element 12 has four positioning means 17 to ensure that when module unit 10 is attached, a single position is achieved in which the support element 12 is fixed to the motor vehicle component. These positioning means are designed as recesses. Alternative geometric embodiments and alternative positioning means can also be contemplated.

Figure 5:
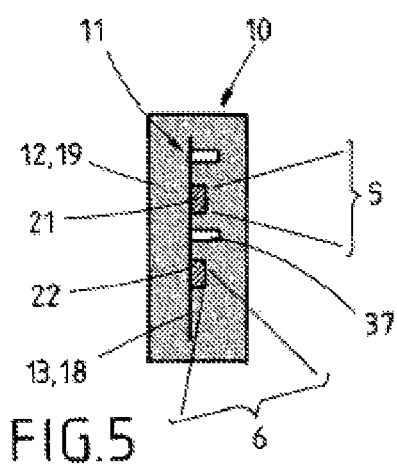
FIG. 5 shows an additional alternative of the embodiment of the module unit according to the invention.

FIG. 5 shows the module unit 10 having the sensor device 11, wherein the electronic device 13 has a circuit board 18, and the first sensor 21 and the second sensor 22 are arranged on said circuit board 18. A shielding element 37 is included between both sensors 21, 22. In the event that the sensors 21, 22 are capacitive sensors, the shielding element 37 serves to ensure satisfactory functioning of the total arrangement. In addition, the first detection area 5 is functionally assigned to the first sensor 21, and the second detection area 6 is functionally assigned to the second sensor 22. The electronic device 13 is enclosed in a casting compound 19, which functions as the support element 12. The module unit 10 can be fixed to the motor vehicle via various attachment options, as already indicated in FIG. 1.

Figure 6:
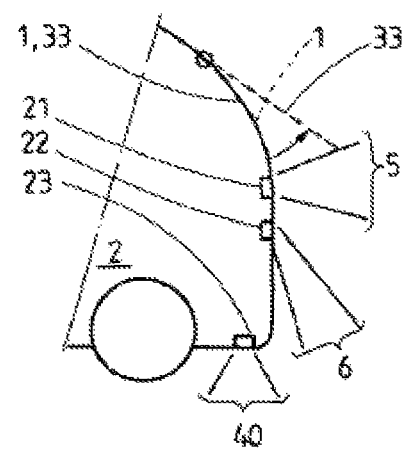
FIG. 6 shows an additional alternative of the module unit according to the invention, having three sensors.

The module unit 10 in FIG. 6 has a first sensor 21 and a second sensor 22. In addition, a third sensor 23 can be integrated into the module unit 10. The third sensor 23 has a third detection area 40. The hatch door 1 can be opened as a result of positive detection via the first 21 and the second sensors 22. Positive detection via the first 21 and the third sensors 23 enables the opening of a windowpane 33 arranged in a movable manner on the hatch 1. In this case, the object only needs to approach the first sensor 21. Subsequently, a foot movement occurring in the detection area 40 leads to activation of the movement of the windowpane 33. A positive detection via the second sensor 22 and the third sensor 23 enables the hatch 1 and/or the windowpane 33 to close again.

Figure 8:
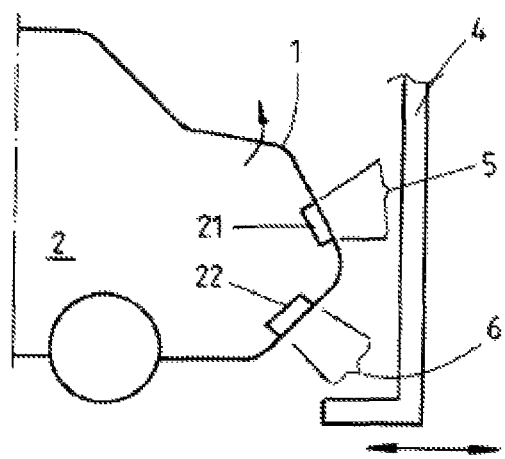
FIG. 8 shows an additional embodiment alternative of the module unit according to the invention.

FIG. 8 shows a motor vehicle 2 in a schematic illustration. The motor vehicle is constructed having a module unit 10 in the hatch area thereof, and the module unit 10 has a first sensor 21 and second sensor 22, each of which have different detection areas 5, 6. The detection procedure can be performed in such a manner that both the first sensor 21 and also the second sensor 22 detect an object at the same time. In this case, the detection sizes of the detection areas are different. The detection area 5 includes a smaller area of functionality, meaning that the object must approach very close to the module unit 10 to be recognized by the sensor 5. The detection area 6 functions over a larger distance than the first detection area 5.

As shown in FIG. 8, a detection can take place in such a manner that an object 4 is initially detected via the second sensor 22. Next, the object must approach very close to the first sensor 21 in order for a positive detection to occur, and a corresponding actuation of the moving part 1 to take place. Likewise, a configuration can be contemplated wherein a detection of the object 4 occurs via the first sensor 21, and the second sensor 22 is then activated for the purpose of detecting the object 4 inside its second detection area.

Likewise, as shown in FIG. 8, a configuration can be contemplated wherein the object 4 must move away from the vehicle following successful detection by both sensors 21, 22 in order for a corresponding activation of the moving part 1 to be initiated, as is shown by the schematically illustrated double arrow.

FIG. 9 shows an additional embodiment in a purely schematic illustration, in which the module unit 10 is arranged inside a hatch camera device 7 of a hatch door 1. Both sensors 21, 22 are integrated inside the hatch camera device 7. A third sensor 23 is located on the vehicle itself, on a bumper, and comprises its own detection area 40. The third sensor 23 can be activated via a leg or foot movement of the user. As an alternative, a configuration can also be contemplated wherein the third sensor 23 is arranged inside the tire 8. The third sensor 23 inside the tire 8 can be activated by an intentional step between the tires 8. The sensor 23 inside the tire 8 can be a pressure sensor, for example, which detects such a bump against the tire.

With respect to the module unit 10 inside the hatch camera device 7, in an alternative configuration, the camera of the hatch camera device 7 can function as the first sensor 21 or as the second sensor 22.

FIG. 10 shows a purely schematic illustration of a possible embodiment of the support element 12, wherein a first sensor 21 and a second sensor 22 are arranged on the same, and each comprise their own corresponding detection area 5 and 6. The support element 12 has a corresponding profile 38 having a recess 24. The electronic device 13 is arranged in said recess 24. A cover element 25 is placed on the profile 38 for the purpose of reliably sealing the electronic device 13, and said cover element 25 also has an additional seal 34. As an alternative, the electronic device 13 can be entirely cast or molded inside the module support 10. The module support 10 is attached to the vehicle 2 and/or to the moving part 1.

Figure 12:
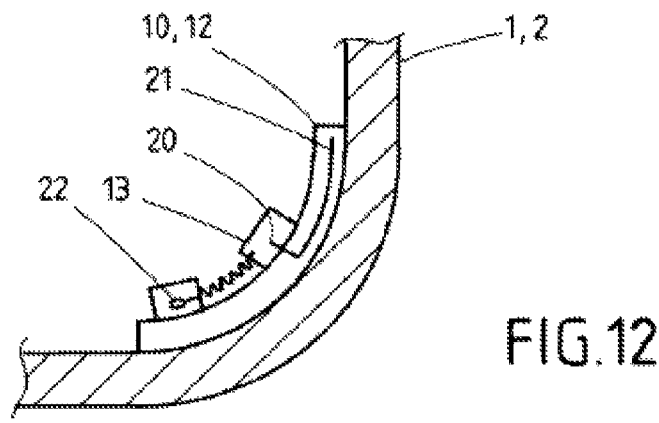
FIG. 12 shows an additional embodiment of the module unit.

In FIG. 12, the first sensor 21 is designed as a reinforcing element. The first sensor 21 is located inside the support element 12, and a contact terminal 20 of the first sensor 21 projects out of the support element 12. The electronic device 13 is attached at the contact terminal 20. The second sensor 22 is separated from the first sensor 21 and attached on the support element 12. The second sensor 22 is connected to the electronic device 13 via a cable element. The module unit 10 is attached to a component on the motor vehicle 1, 2.

Figure 13:
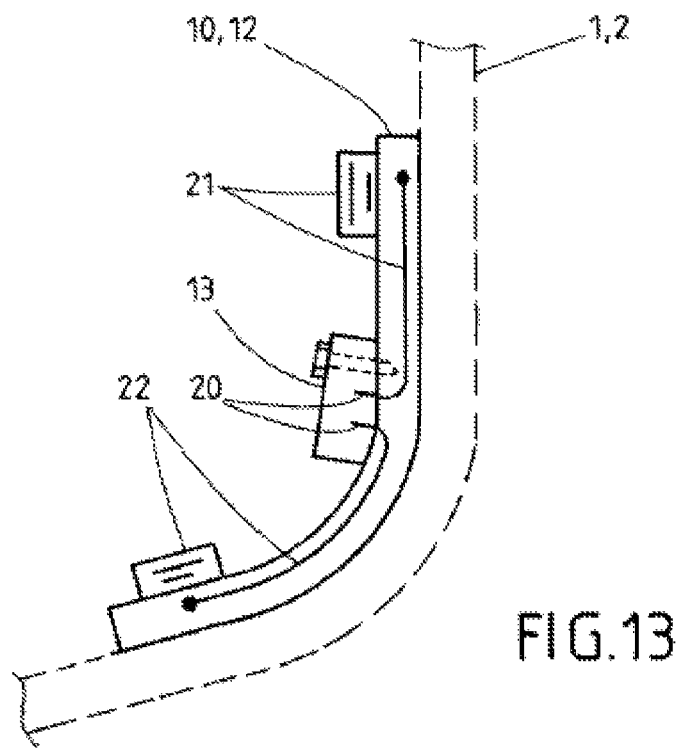
FIG. 13 shows an additional embodiment alternative of the module unit.

FIG. 13 shows an additional embodiment of a module unit 10, wherein a sensor 21 is integrated as a partial sensor inside the support element 12.

The second partial sensor 21 is located and attached inside the support element 12. Both partial sensors are electrically connected to each other, and both partial sensors together form the first sensor 21. The latter has a contact terminal 20 arranged outside, as shown in FIG. 12, the same being connected to the electronic device 13. In this case, the electronic device 13 is connected via a screw connection to the support element 12. The second sensor 22 is likewise formed by two partial sensors, wherein the first partial sensor is attached to the support element 12 on the inside, and the second partial sensor runs inside the support element 12. The second sensor 22 also has a corresponding contact terminal 20 arranged outside which is connected to the electronic device 13. The module unit 10 can be attached to a component of the motor vehicle 1, 2.

Figure 14:
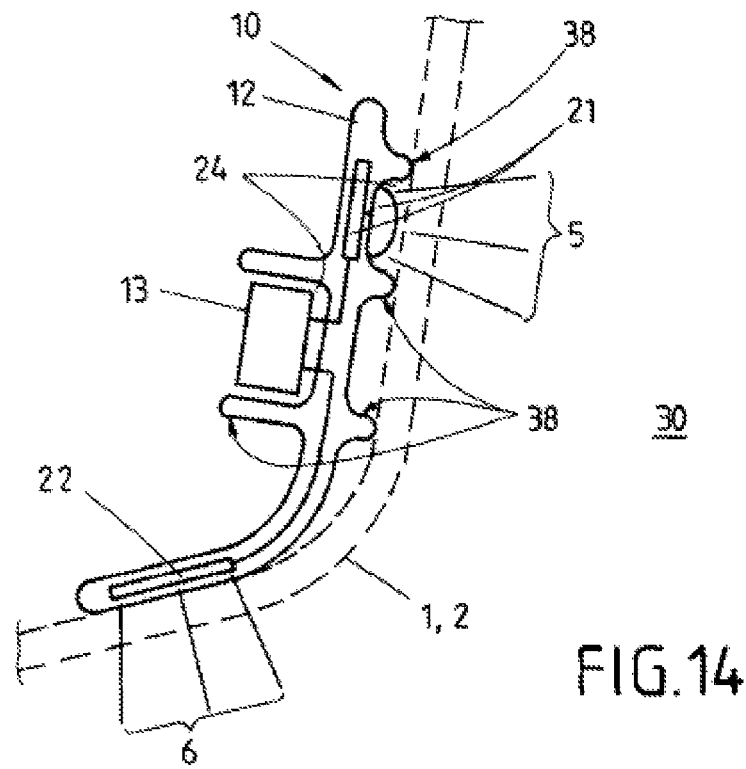
FIG. 14 shows an additional embodiment alternative of the module unit.

As shown in FIG. 14, the module unit 10 has a corresponding profiling 38 which is designed on the support element 12. A recess 24 is provided inside, and is situated on the inner side of, the profiling 38, and the electronic device 13 is arranged inside said recess 24. In addition, the profile 38 also comprises an outer side, wherein a recess 24 is also formed inside, and is situated on the outside of, the profile 38. The first sensor 21 is arranged inside this recess 24. The outer side of the profile 38 is designed having rod-like extensions which directly abut the motor vehicle component 2 and which effect a reliable sealing and insulation of the first sensor 21. The first sensor 21 is connected to the electronic device 13. In addition, a second sensor 22 is integrated inside the support element 12. The sensor 21 is likewise formed by the partial sensor 21 located inside the support element 12 and the partial sensor 21 located inside the outer side of the profile 38. Of course, a configuration can also be contemplated wherein only one sensor element 21 is arranged in each recess 24 of the outer side of the profile 38. In the present embodiment, the first sensor 21 is located at least partially between the support element 12 and the motor vehicle part 2.

With respect to FIG. 1 and to the remaining embodiments, a configuration can also be contemplated wherein the sensor device 11 is located between the support element 12 and the motor vehicle component 1, 2, and also wherein the support element 12 is positioned between the sensor device 11 and the motor vehicle component 1, 2.

Figure 16:
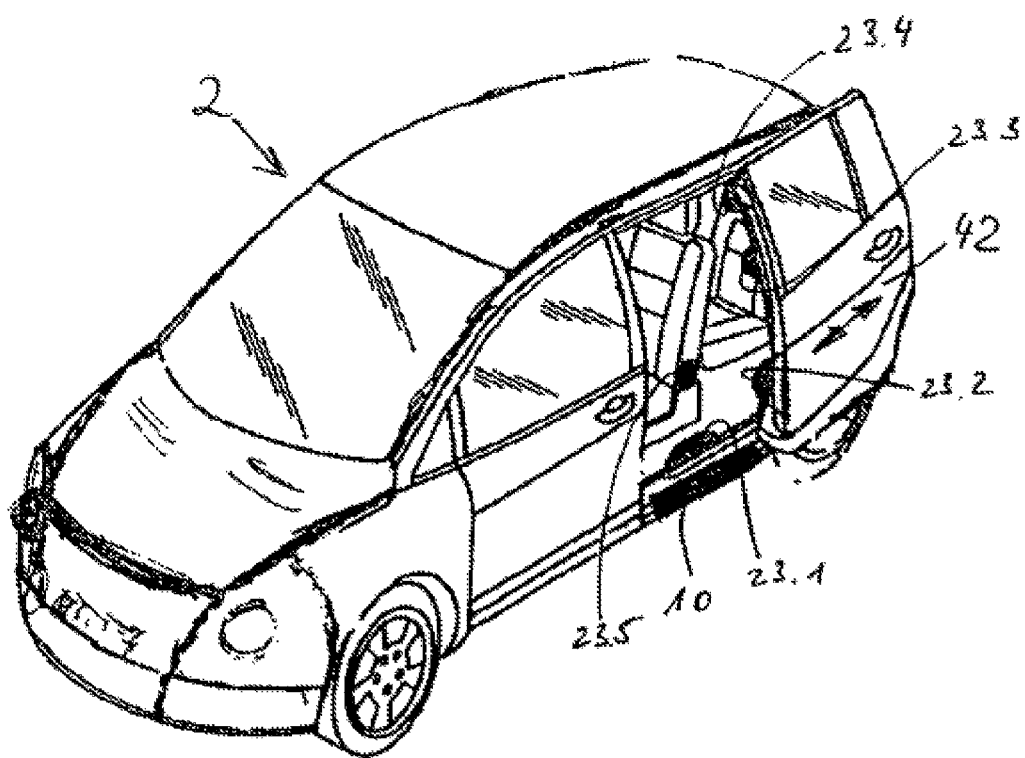
FIG. 16 shows an additional embodiment alternative for the positioning of the module unit according to the invention.

FIG. 16 shows an additional alternative embodiment of a possible positioning of the module unit 10.

In the present embodiment, the module unit 10 is located on the door sill of the sliding side door 42 of the motor vehicle 2. The sliding side door 42 can slide in this case as indicated by the double arrow. In the present embodiment, the sliding side door 42 is open. The module unit 10 can comprise an embodiment as described above with reference to FIGS. 1 to 15. If the sliding door 42 is closed, the sensor device of the module unit 10 can detect an authorized user who is close to the sliding door 42, thereby initiating a corresponding actuation and/or opening operation of the sliding side door 42. As can be seen in FIG. 16, a third sensor 23 or at least one of the following third sensors can be arranged inside the motor vehicle 2. These are indicated by the reference numbers 23.1, 23.2, 23.3, 23.4 and 23.5. The sensor 23.1 can be actuated via the foot of the user. The sensor 23.2 can be actuated via the knee of the user. The sensor 23.3 can be actuated via the elbow and/or the shoulder of the user. The sensor 23.4 can be actuated via the head of the user. The sensor 23.5 can be actuated via the foot, the knee or the elbow of the user. If the user is located inside the motor vehicle 2, an actuation of one of the named third sensors 23 can initiate a closing movement of the sliding side door 42. The third sensors 23 are in this case connected to the electronic device 13, particularly to the control device, such that both the sensors inside the module unit 10 and also the sensors 23 on the inner side communicate with the same electronic device.

If the authorized user is inside the motor vehicle 2 and the sliding door 42 is closed, then the user can initiate the opening operation of the sliding side door 42 by means of actuating one of the third sensors 23 on the inside. In this case, an authentication can occur in parallel which tests to what extent the user is actually the authorized user, for the purpose of achieving such an opening of the door 42. The authentication typically occurs by means of an ID transmitter. This is described in greater detail below. Likewise, a configuration can be contemplated wherein no authentication is carried out.

The speed of the opening movement and/or the closing movement of the sliding door 42 can be modified. For example, a configuration can be contemplated wherein such a speed setting is controlled or regulated via the electronic device inside the module unit 10.

For example, the electronic device can be connected to a rain sensor. Depending on the strength of the rain detected by the rain sensor, the control device can effect a high speed for the opening movement and/or closing movement.

Figure 15:
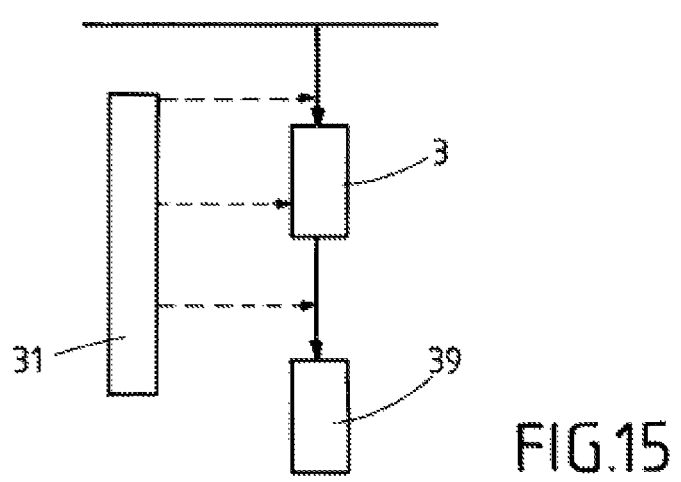
FIG. 15 shows a schematic flow chart which incorporates the authentication process and the detection process.

FIG. 15 shows a purely schematic illustration, wherein the detection procedure 3, during which the sensor device 11 is active, can take place at the same time as an authentication procedure 31 which tests to what extent the authorized person may actuate the moving part. In the event that the person is carrying a corresponding "correct" ID transmitter, a positive authentication results. This authentication 31 can take place prior to the detection 3, during the detection 3, and following the detection 3. The detection in this case only includes the testing of a possible person or a possible object in the proximity of the module unit 10. This is indicated in greater detail in FIGS. 1 to 16. In step 39, the subsequent activation of the actuation of the moving part, meaning the opening or closing operation, takes place, but only if both a positive authentication 31 and a positive detection 3 have taken place.

FIG. 17 shows, by way of example, a three-dimensional view of the attachment of the electronic device 13. In this case, the electronic device 13 has a housing with two beam-like feet 51. The housing of the electronic device 13 is supported by means of these two feet 51 on the support element 12, particularly on a lower crossbeam 12.2 of the module unit 10. The feet 51 are, however, not connected to the support element 12 in FIG. 17, such that additional holding elements 50 are used, the same being likewise attached to the support element 12, and particularly to an upper crossbeam 12.1. In the present case, in FIG. 17, both holding elements 50 are arranged in the upper rear area on the left and right sides of the housing of the electronic device 13. These holding elements 50 are connected to the housing with a material connection, for example, in order to therefore enable a mechanically secure hold. The holding elements 50 work together with opposing holding elements 50' on the support element 12, and particularly with a first crossbeam 12.1. For this purpose, the U-shaped holding elements 50 can be provided with cone-shaped or sloped projections which work together in a positive-fitting manner with the opposing holding elements 50' on the first crossbeam 12.1, said opposing holding elements 50' being designed as drill holes.

As such, the electronic device 13 is securely attached to the support element 12 or to the bumper or to the door sill or the like, directly or indirectly on the vehicle 2, even when intense mechanical influences arise. In addition, in the present case, the upper crossbeam 12.1 and the lower crossbeam 12.2 are provided on the support element 12, and form a more or less U-shaped recess 24 for the electronic device 13. The electronic device 13 stands on its feet 51 on the lower crossbeam 12.2, however, a hanging attachment from the first crossbeam 12.1 could also be contemplated. The feet 51 in FIG. 17 can be made of an elastic material in order to therefore absorb mechanical impacts. A configuration can also be contemplated wherein the electronic device 13 is only connected to the support element 12 or to the vehicle 2 via the feet 51 in a positive-fitting, and/or force-fitting, and/or material connection.

In FIG. 18, which discloses an additional attachment of the electronic device 13 in FIG. 17, the feet 51 are arranged in U-shaped buffers 52 in order to therefore enable, on the one hand, a positive-fit attachment, and on the other hand, a shock-absorbing holding of the electronic device 13 on the vehicle 2 and/or on the support element 12. In FIG. 18, the U-shaped recess in the buffer elements 52 is designed to open to the front, although it can also be closed, such that the electronic device 13 is also attached on the forward side thereof to the support element 12 by means of the buffer elements 52. Of course, a configuration can also be contemplated wherein instead of the illustrated, beam-like feet 51, cylindrical feet 51 or the like are used, and the same work together with corresponding complementary buffer elements 52 on the vehicle 2 or on the support element 12. At this point, it should also be noted that a configuration can also be contemplated wherein the feet 51 and the buffer elements 52 are swapped in order to create a complementary attachment of the electronic device 13 to the vehicle 2. In the present case, in FIG. 18, the U-shaped holding elements 50 have what are basically metal clips 53 which grip into the upper crossbeam 12.1 of the support element 12 to therefore hold the electronic device 13 on the support element 12 in a positive-fitting and/or force-fitting manner. In the case of the illustrated electronic device 13, two sensor connections 21' and 22' are illustrated for the first sensor 21 and the second sensor 22. Of course, a third or more sensors can be included as well. In addition, only one sensor 21 can be present in the sensor device 11 and/or module unit 10 according to the invention.

In FIGS. 19 to 22, different variants of the embodiment of water shunting elements 54 are illustrated. The configurations intend to conduct water away from the detection area 5, 6 of the sensors 21, 22 and 23 as quickly and directly as possible by means of these water shunting elements 54. Sensors which function capacitively react strongly to water, and particularly to salt water, which can often be present in winter where snow and ice is found on the road.

In FIG. 19, a first water shunting element 54 in the form of a wedge-shaped element is included above the first sensor 21 and on the outer side of the support element 12 and/or the bumper of the motor vehicle 2. If water 55 (see arrow 57) then courses along the outer side, meaning the side which faces away from the sensors 21 and 22, the water 55 reaches the first water element 54 as a result of gravity. Due to the forces of adhesion present, the water 55 flows along the sloping water shunting element 54 and separates at the lower cut edge of the water shunting element 54 from the support element 12 and/ or the bumper, door sill, or the like. The water 55 then drops to the ground from this cut edge, such that it is safely prevented from continuing to flow along the outer side and into the detection area 5 of the first sensor 21. As such, the configuration ensures that even though the water crosses the detection area 5 briefly, it does not remain there constantly— as in an exemplary flow path. Further below, an additional water shunting element 54 is located on the support element 12 and is designed with an approximately triangular shape. It likewise forms a cut edge for the water 55 flowing along the same. As such, it is also possible at this point to safely prevent the water 55 from continuing to flow along the outer side of the support element 12 into the detection area 6 of the second sensor 22. The detection areas 5 and 6 are shown in FIG. 19 for both sensors 21 and 22 in a purely schematic way. Next to the second sensor 22 to the right, an additional water shunting element 54 is arranged on the opposite side of the sensor element 22, and is designed comparably to the triangular water shunting element described above. This right-side water shunting element 54 serves to conduct water 55 past the detection area 6 from the right side as well.

In FIG. 20, and at analogous places in FIG. 19, other types of water shunting elements 54 for both sensors 21 and 22 are illustrated. In this case, the water shunting elements 54 comprise a cut breakaway edge for the water 55.

As such, the configuration also uses these water shunting elements 54 to ensure that the water 55 does not simply flow along the outer surface, or optionally the inner surface, of the support 12 or the bumper, door sill, or the like, thereby arriving in the detection areas 5, 6 of the sensors 21, 22. The central water shunting element 54, which is arranged on the outer side of the second sensor 22 on the left, has a triangular or wedge-shaped bump in order to therefore form a breakaway edge for the water 55. The arrow 57 shows the normal flow direction of the water 55. The additional arrow 56 shows the wind direction when the vehicle 2 is moving, wherein said wind direction can also influence the direction of flow of the water 55. In FIG. 20, the right-side water shunting element 54 is likewise only portrayed as a breakaway edge for the sensor 22.

Figure 21:
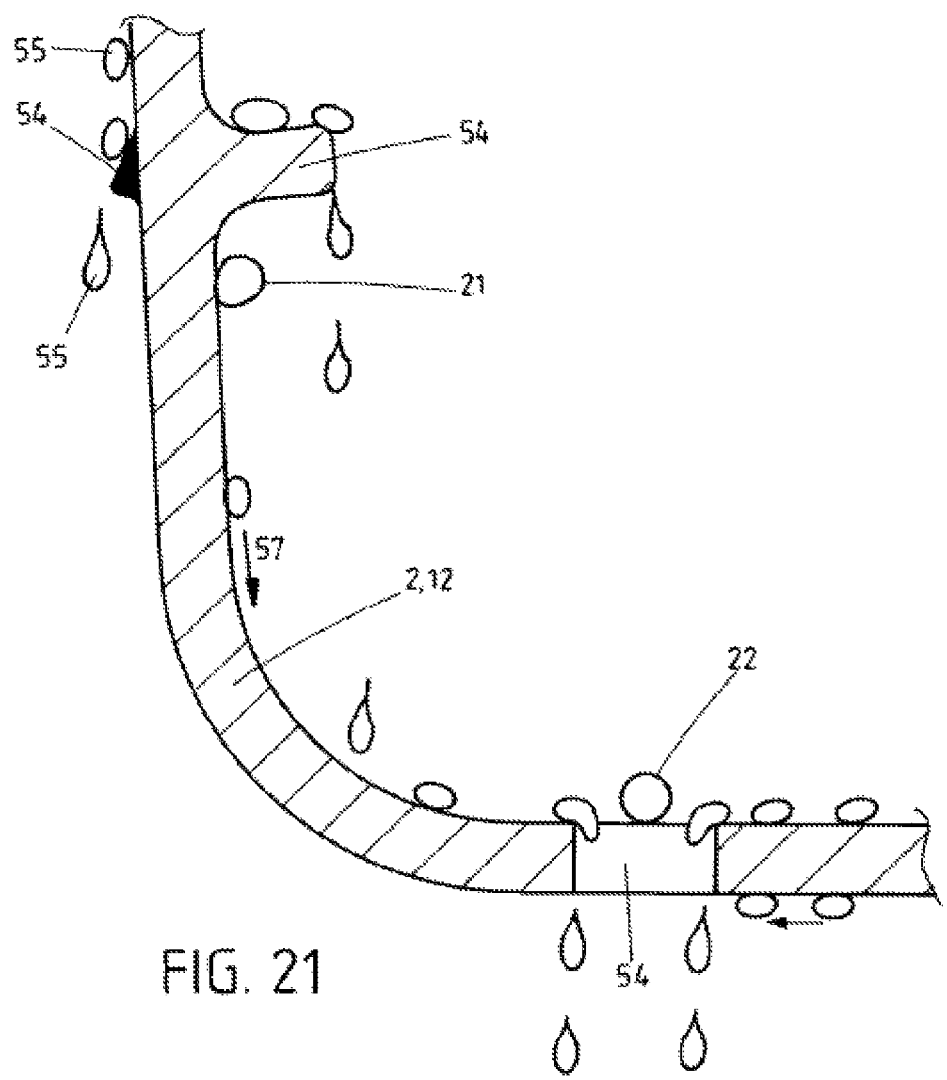
FIG. 21 shows an additional embodiment of the water shunting elements for the sensors.

FIG. 21 shows inner water shunting elements 54 for the sensors 21, 22 in supplement to the outer water shunting elements 54 previously shown in FIGS. 19 and 20. As such, a projection is provided over the first sensor 21, and said projection functions as a water shunting element 54. The lower edge of the projection-like water shunting element 54 serves as a breakaway edge in this case for the water droplets 55 flowing along the same. In addition, a triangular water shunting element 54 is included on the outer side of the support element 12. Both the inner and outer water shunting elements 54 for the first sensor 21 are arranged at approximately the same height on the support element 12. However, it is important in this geometric arrangement that the water flowing on the surface of the support element 12 breaks away from the same prior to the detection area 5.

As can be seen in the case of the second sensor 22 below, a drill hole, a perforation, a slot hole, or the like is included in the support element 12. This enables the water 55 which collects inside the support element 12 to be removed. This water shunting element 54 can also be arranged to the left or the right of the second sensor 22 in order to therefore prevent the water droplets 54 from flowing away in the detection area 6 of the second sensor 22.

Figure 22:
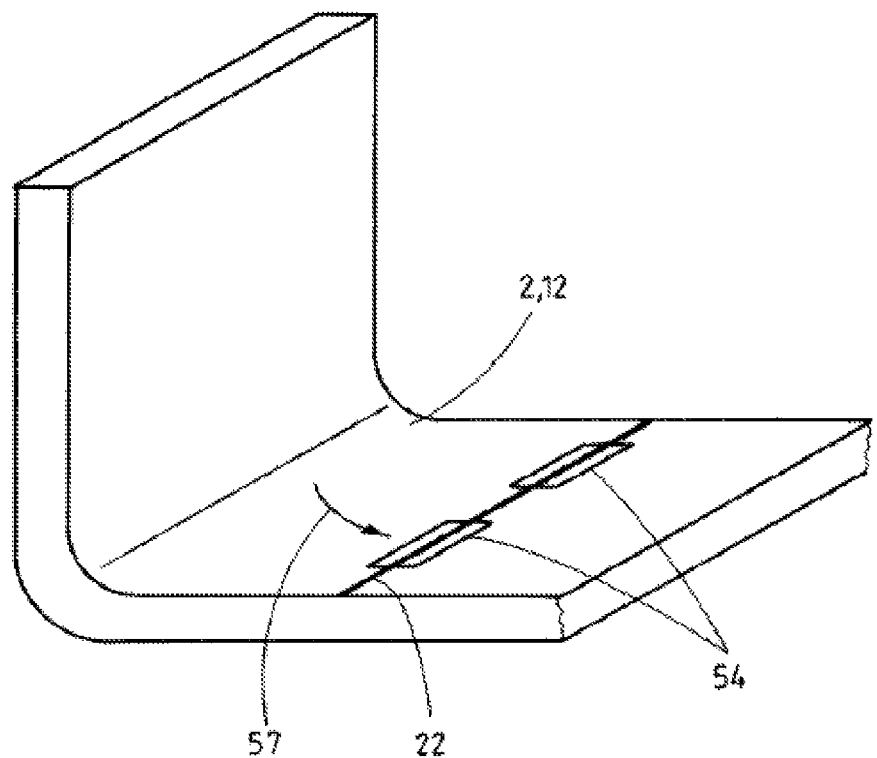
FIG. 22 shows a schematic, three-dimensional view of a longitudinal sensor having water shunting elements.

Turning to FIG. 22, a three-dimensional view is given of two water shunting elements 54 below the sensor 22, wherein the water shunting elements 54 are designed as slot holes. As already mentioned, it can also be practical to arrange these slot hole-like water shunting elements 54 to the left and to the right of the corresponding sensor 21, 22, thereby also simplifying the attachment of the corresponding sensor 21, 22.

At this point it should be noted that, instead of the support element 12 mentioned above, a bumper, door sill, side step, stone guard, or the like can also be employed—as mentioned above multiple times—as the support for the sensors on the vehicle 2.

The invention claimed is:

1. A module unit comprising:
   a sensor device for actuating a moving part of a motor vehicle,
   a support element,
   wherein the sensor device is arranged on said support element and has at least one sensor to enable detection of an object in at least one detection area adjacent to the motor vehicle, such that the actuation of the moving part can itself be activated via said detection,
   wherein the module unit is designed as a module which can be manually handled as a single device, such that the module unit can be attached to the motor vehicle and
   wherein an electronic device comprising a control device connected to the sensor device is arranged on the support element.

2. A module unit according to claim 1,
   wherein attachment elements are included and serve to attach the module unit to the motor vehicle.

3. A module unit according to claim 2,
   wherein the support element can be attached to the motor vehicle with a positive fit, force fit, material connection, locking connection, and/or can slide into an opposing element on the motor vehicle.

4. A module unit according to claim 1,
   wherein
   the sensor has a longitudinal extension, and wherein the sensor is designed as a flexible device.

5. A module unit according to claim 1,
   wherein the sensor device and/or the electronic device is/are attached to the support element with a positive fit, force fit and/or material connection.

6. A module unit according to claim 1,
   wherein the electronic device has a circuit board, and the sensors are arranged on the circuit board, wherein the circuit board is integrated with the sensors inside a casting compound.

7. A module unit according to claim 1,
   wherein the electronic device transmits signals wirelessly to a primary electronic device on the motor vehicle.

8. A module unit according to claim 1,
   wherein the electronic device functions as a primary electronic device of the motor vehicle.

9. A module unit according to claim 1,
   wherein the electronic device is supplied with energy by means of induction.

10. A module unit according to claim 1,
    wherein at least one sensor is arranged between the support element and a component on the motor vehicle, wherein the support element is designed having a profile which is oriented toward the component on the motor vehicle, and said profile provides a defined installation site for the sensor which is especially sealed with respect to the outside the vehicle.

11. A module unit according to claim 1, wherein a speed of an opening movement and/or a closing movement of a sliding door can be modified, wherein the electronic device controls and/or regulates the speed of the opening and/or closing movement of the sliding door.

12. A module unit comprising:
a sensor device for actuating a moving part of a motor vehicle, a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle and
wherein an electronic device comprising a control device connected to the sensor device can be arranged on the support element,
wherein the sensor device has at least one first and one second sensor, wherein the sensors have different detection areas, and the different detection areas are of a different size.

13. A module unit according to claim 12, wherein the electronic device communicates with at least one further third sensor which is arranged on the motor vehicle, and is connected to the same.

14. A module unit according to claim 13, wherein the third sensor is arranged in a tire, on a hatch camera device, on a license plate illumination device, on a garnish molding, on a bumper, on a lock cylinder of a locking device, in a locking device for locking a steering column, in a windshield washer assembly, in a hatch light, or in a handle of the motor vehicle.

15. A module unit according to claim 14, wherein the third sensor is a heat sensor, a proximity sensor, a speech sensor, or an image sensor, for detecting a field of vision.

16. A module unit according to claim 14, wherein positioning means are included to ensure a single, discrete attachment configuration of the support element to the motor vehicle.

17. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle, wherein the motor vehicle has a hatch door and/or a hatch camera and/or an emblem, and
wherein the module unit is arranged on the hatch door and/or at least partially on the hatch camera and/or on the emblem.

18. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle,
wherein an electronic device comprising a control device connected to the sensor device is arranged on the support element, and
wherein the sensor device and/or the electronic device is/are integrated into the support element.

19. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle,
wherein an electronic device comprising a control device connected to the sensor device is arranged on the support element, and
wherein the sensor device and/or the electronic device form a monolithic component together with the support element.

20. A module unit comprising:
a sensor device for actuating a moving part of a motor vehicle, a support element,
wherein the sensor device is arranged on said support element and has at least one sensor to enable detection of an object in at least one detection area adjacent to the motor vehicle such that the actuation of the moving part can itself be activated via said detection,
wherein the module unit is designed as a module which can be manually handled as a single device, such that the module unit can be attached to the motor vehicle and
wherein an electronic device comprising a control device connected to the sensor device can be arranged on the support element,
wherein at least one sensor is integrated as a partial sensor inside the support element, wherein at least one contact terminal of the partial sensor projects out of the support element.

21. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle,
wherein an electronic device comprising a control device connected to the sensor device can be arranged on the support element, and wherein the support element has a recess in which the electronic device is located, and a cover element closes and seals the recess.

22. A module unit comprising:
a sensor device for actuating a moving part of a motor vehicle, a support element,
wherein the sensor device is arranged on said support element and has at least one sensor to enable detection of an object in at least one detection area adjacent to the motor vehicle such that the actuation of the moving part can itself be activated via said detection,
wherein the module unit is designed as a module which can be manually handled as a single device, such that the module unit can be attached to the motor vehicle and
wherein an electronic device comprising a control device connected to the sensor device can be arranged on the support element,
wherein a testing module is included which tests a functionality of the sensor device.

23. A module unit comprising:
a sensor device for actuating a moving part of a motor vehicle, a support element,
wherein the sensor device is arranged on said support element and has at least one sensor to enable detection of an object in at least one detection area adjacent to the motor vehicle such that the actuation of the moving part can itself be activated via said detection,
wherein the module unit is designed as a module which can be manually handled as a single device, such that the module unit can be attached to the motor vehicle and
wherein an electronic device comprising a control device connected to the sensor device can be arranged on the support element,
wherein an emergency switch is included which can be accessed from outside the vehicle and which can be activated by a touching action performed by a user.

24. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection,
wherein the module unit is designed as a module which can be manually handled as a single device, such that the module unit can be attached to the motor vehicle,
wherein an illuminating device is provided which is configured to be activated during the detection, and
wherein the illuminating device provides a user with feedback via defined manner of illumination.

25. A module unit comprising:
a sensor device for actuating a moving part of a motor vehicle, a support element,
wherein the sensor device is arranged on said support element and has at least one sensor to enable detection of an object in at least one detection area adjacent to the motor vehicle such that the actuation of the moving part can itself be activated via said detection,
wherein the module unit is designed as a module which can be manually handled as a single device, such that the module unit can be attached to the motor vehicle and
wherein an electronic device comprising a control device connected to the sensor device can be arranged on the support element,
wherein a threshold value regulation is provided which recognizes an actual touch of a user on the moving part.

26. A module unit comprising:
a sensor device for actuating a moving part of a motor vehicle,
a support element,
wherein the sensor device is arranged on said support element and has at least one sensor to enable detection of an object in at least one detection area adjacent to the motor vehicle, such that the actuation of the moving part can itself be activated via said detection, and further includes at least one second sensor
wherein the second sensor has a different detection area than the first sensor and the different detection areas are a different size,
wherein the module unit is designed as a module which can be manually handled as a single device, such that the module unit can be attached to the motor vehicle, and
wherein the module unit is arranged in a hatch area or an area of the side door of the motor vehicle underneath a sliding side door.

27. A module unit according to claim 26,
wherein an electronic device is connected to at least one third sensor and/or switch, and the same is arranged inside the motor vehicle, and the third sensor and/or switch is arranged in the motor vehicle in such a manner that it can be actuated via a foot, and/or a knee, and/or elbow, and/or shoulder, and/or head of a user.

28. A module unit according to claim 27,
wherein an opening movement and/or closing movement of the sliding side door can be initiated by means of an actuation of the third sensor and/or switch.

29. A module unit according to claim 27,
wherein the third sensor can be deactivated according to an operating state of the motor vehicle.

30. A module unit according to claim 27,
wherein an additional door and/or hatch door and/or tank door of the motor vehicle can be unlocked and/or locked, and the locking and/or unlocking is initiated via an actuation of the third sensor.

31. A method for the actuation of a moving part of a motor vehicle, having a module unit which includes a support element, the method comprising:
arranging a sensor device having at least one sensor on said support element,
connecting an electronic device to the sensor device and arranging the electronic device on the support element, and
enabling the detection of an object in at least one detection area adjacent to the motor vehicle,
actuating the moving part via said detection, and
employing an authentication procedure comprising testing to what extent the object is authorized to actuate the moving part,
wherein the authentication procedure is performed prior to the detection, after the detection, and/or during the detection.

32. A method according to claim 31,
wherein a first sensor and a second sensor are included, and further comprising an authorized user executing a conscious action which is detected by the second sensor.

33. A method according to claims 32, further comprising initially activating the first sensor, and subsequently activating the second sensor, for the purpose of the detection, or activating both sensors at the same time for the purpose of the detection.

34. A method according to claim 31,
wherein illuminating, during the detection, at least one illuminating unit of the motor vehicle by a defined manner of illumination.

35. A method according to claim 31,
wherein said actuating of the moving part takes places after a defined period of time and/or according to a defined distance which the user has from the module unit.

36. A method according to claim 35, further comprising an illuminating device communicating a necessary distance to the user according to a manner of illumination.

37. A method according to claim 31, further comprising starting the authentication procedure and activating the sensor device via an ID transmitter which a user carries, even though the user is particularly located outside a detection area.

38. A method according to claim 31, wherein the module unit is operated by means of the method, the module unit comprising a sensor device for actuating a moving part of a motor vehicle, a support element, wherein the sensor device is arranged on said support element and has at least one sensor to enable detection of an object in at least one detection area adjacent to the motor vehicle, such that the actuation of the moving part can itself be activated via said detection, and wherein the module unit is designed as a module which can be manually handled as a single device, such that the module unit can be attached to the motor vehicle.

39. A method for the actuation of a moving part of a motor vehicle, having a module unit which has a support element, the method comprising: arranging a sensor device having at least one sensor on said support element
and enabling the detection of an object in at least one detection area adjacent to the motor vehicle, actuating the moving part via said detection, and
employing an authentication procedure comprising testing to what the object is authorized to actuate the moving part,
wherein the authentication procedure is performed prior to the detection, after the detection, and/or during the detection,
wherein a first sensor and a second sensor are included, and further comprising an authorized user executing a conscious action which is detected by the second sensor,
further comprising detecting a leg movement or foot movement of the user by means of the first sensor, and detecting an additional body movement of the user by means of the second sensor.

40. A method for the actuation of a moving part of a motor vehicle, having a module unit which has a support element, the method comprising: arranging a sensor device having at least one sensor on said support element
and enabling the detection of an object in at least one detection area adjacent to the motor vehicle, actuating the moving part via said detection, and
employing an authentication procedure comprising testing to what extent the object is authorized to actuate the moving part,
wherein the authentication procedure is performed prior to the detection, after the detection, and/or during the detection,
further comprising activating the actuation of the moving part according to a speed signal of a motor vehicle.

41. A method for the actuation of a moving part of a motor vehicle, having a module unit which has a support element, the method comprising: arranging a sensor device having at least one sensor on said support element
and enabling the detection of an object in at least one detection area adjacent to the motor vehicle, actuating the moving part via said detection, and
employing an authentication procedure comprising testing to what extent the object is authorized to actuate the moving part,
wherein the authentication procedure is performed prior to the detection, after the detection, and/or during the detection,
wherein a first sensor and a second sensor are included, and further comprising an authorized user executing a conscious action which is detected by the second sensor,
further comprising providing a third sensor, and opening a hatch of the motor vehicle by means of a positive detection via the first sensor and the second sensor, and arranging a windowpane on the hatch and opening the same by means of a positive detection via the first and the third sensors, and closing the hatch by means of a positive detection via the second and the third sensors.

* * * * *